United States Patent
Kriz et al.

[11] Patent Number: 6,157,592
[45] Date of Patent: Dec. 5, 2000

[54] ACOUSTIC POSITION DETERMINATION METHOD AND APPARATUS

[75] Inventors: J. Stanley Kriz; Patrick K. Garner, both of Fairfax, Va.

[73] Assignee: Resolution Displays, Inc., Fairfax, Va.

[21] Appl. No.: 09/110,208

[22] Filed: Jul. 6, 1998

[51] Int. Cl.[7] .................................................. G01S 3/80
[52] U.S. Cl. ........................ 367/127; 367/124; 367/129
[58] Field of Search .................................. 367/124, 127, 367/129

[56] References Cited

U.S. PATENT DOCUMENTS

| | | |
|---|---|---|
| 4,012,588 | 3/1977 | Davis et al. . |
| 4,313,183 | 1/1982 | Saylors . |
| 4,558,439 | 12/1985 | Güdeson . |
| 4,636,996 | 1/1987 | Tsuji . |
| 4,751,689 | 6/1988 | Kobayashi . |
| 4,758,691 | 7/1988 | De Bruyne . |
| 4,807,202 | 2/1989 | Cherri et al. . |
| 4,893,298 | 1/1990 | Greenwood et al. . |
| 4,933,915 | 6/1990 | Boström . |
| 4,933,916 | 6/1990 | May et al. . |
| 5,075,863 | 12/1991 | Nagamune et al. . |
| 5,142,506 | 8/1992 | Edwards . |
| 5,144,594 | 9/1992 | Gilchrist . |
| 5,206,838 | 4/1993 | Kashiwase . |
| 5,214,615 | 5/1993 | Bauer . |
| 5,214,619 | 5/1993 | Bauer . |
| 5,339,259 | 8/1994 | Puma et al. . |
| 5,379,269 | 1/1995 | Sindeband et al. . |
| 5,488,662 | 1/1996 | Fox et al. . |
| 5,491,670 | 2/1996 | Weber . |
| 5,495,427 | 2/1996 | Puma et al. . |
| 5,659,520 | 8/1997 | Watson et al. . |

OTHER PUBLICATIONS

*Spread Spectrum Systems—With Commercial Applications* 3rd Ed. 1994, John Wiley & Sons Pp. 77–91; 233–235; 500–503.

Primary Examiner—Ian J. Lobo
Attorney, Agent, or Firm—Stephen G. Matzuk

[57] ABSTRACT

Apparatus and methods for rapid and improved accuracy acoustic position determination comprising simultaneous and mutually distinguishable wide-band acoustic transmissions emitted from a plurality of spatially diverse transmitters and reception thereof by one or more receivers. The receivers identify the transmitters by directly (non-demodulated) correlating the received signal against stored or regenerated replicas of the transmitted signals. The location of the receiver is determined relative to the identified transmitter locations according to the measured times-of-flight from the identified transmitters to the receiver. Further embodiments of the method and apparatus of the present invention provides yaw, pitch and roll determination with a plurality of co-located receivers, and an extended and enhanced operating area.

20 Claims, 5 Drawing Sheets

ACOUSTIC POSITION DETERMINATION METHOD AND APPARATUS

FIELD OF THE INVENTION

The present invention relates to 3-dimensional acoustic position determination apparatus and methods, in particular to 3-dimensional acoustic position determination apparatus and methods which include the transmission, reception and identification of pseudo-random binary encoded acoustic signals.

BACKGROUND OF THE INVENTION

Previously known acoustic (audible and ultrasonic) position measurement techniques propagate acoustic pulses or bursts, the leading edges of which are detected and in turn provide time-of-flight information from which the distances from the pulse transmitters are calculated. However, such techniques yield poor rejection of interference from external noise and thus low accuracy.

Measurement and location in 3-dimensions requires measurement from at least three points spaced apart in or near the volume of a region in which the location is to be determined. The three (or more) measurements are usually taken sequentially, where the time for each measurement is sufficient for the pulse to propagate along the maximum distance from the transmitter to the receiver, thus seeking to avoid ambiguity in measurement from simultaneously detected leading edges of the signals. In applications where the operating distances between the transmitters and receiver(s) are 3 meters, the time-of-flight is about 10 milliseconds, which for a minimum of three measurements per point, results in a maximum position update rate of 33 times per second, too low for many applications. Applications requiring simultaneous tracking of dozens of points from sequentially activated transmitters, such as for full body motion capture in virtual environments, typically fail the requirement for line-of-sight paths between transmitters and receivers because portions of the body eclipse the paths. However, adding transmitters to reduce the line-of-sight limitations also adds to the time used to detect, measure, or calculate the three-dimension point locations, further reducing the update rate.

SUMMARY OF THE INVENTION

The present invention provides rapid, accurate and substantially simultaneous three-dimension position determination of one or more points by transmission of a plurality of simultaneously transmitted, statistically nearly orthogonal encoded acoustic signals. Codes are orthogonal when the correlation therebetween is low or minimal. The transmitted acoustic signals are uniquely distinguishable and replicas of them are directly compared to signals received at the location(s) to be determined which provides transmitter identification and corresponding time-of-flight from the particular transmitter to the receiver. When at least three spatially diverse transmitter locations and corresponding times-of-flights are determined (and are above a selected threshold of acceptability), the 3-dimension position of the receiver is calculated.

To enhance signal "detectability" and speed of detection, a novel code is provided and combined in a novel relationship with a translation signal to provide a selected number of novel wide-band composite codes which are transmitted from corresponding spatially diverse transmitter locations. According to a further embodiment, the spatially diverse transmitters are randomly disposed in the area of receiver operation.

BRIEF DESCRIPTION OF THE DRAWING

These and further features of the present invention will be better understood by reading the following Detailed Description together with the Drawing, wherein.

DETAILED DESCRIPTION OF THE PRESENT INVENTION

The apparatus and methods according to the present invention provide for the accurate measurement of the location of a movable receiver, typically associated with a movable person or object, within a field of at least three spatially diverse transmitters which have known or predictable locations. Moreover, according to alternate embodiments, additional 2, 3 (or more) receivers spatially related to the first receiver may be added to provide data from which the yaw, pitch and/or roll orientation of the receivers are calculated. Furthermore, also included are embodiments in which the relationship(s) of the receivers change, such as in "body suit" position monitors which track the position of many points along various portions of the human body.

Figure 1A:
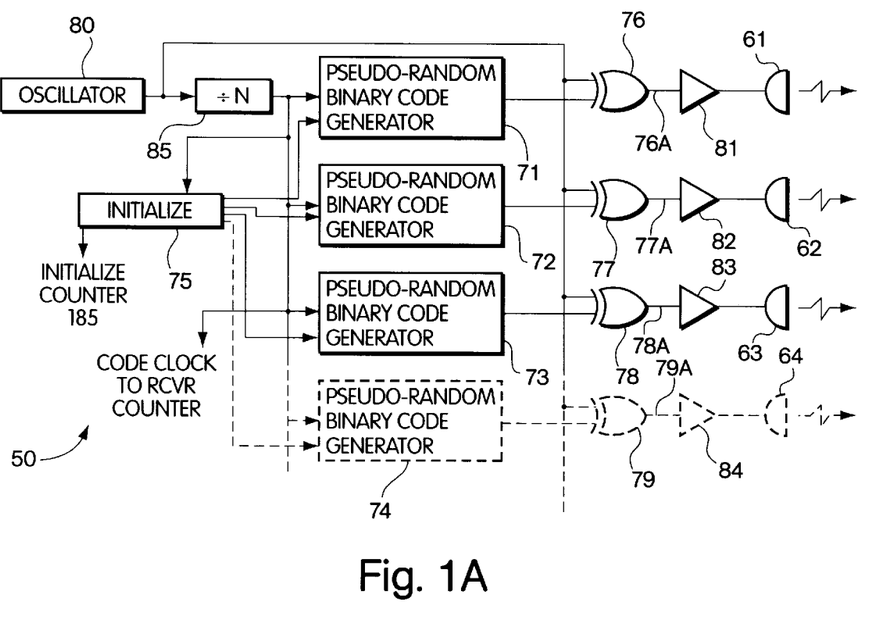
FIGS. 1A and 1B are block diagram representations of the transmitter and receiver portions of one embodiment of the present invention.

A block diagram 50 of the transmitter portion of one embodiment of the present invention is shown in FIG. 1A, wherein a plurality of transducers 61, 62, 63 and 64 are disposed about a volume in which the receiver(s) is (are) operated, preferably non co-linearly disposed. A single dimension determining system may minimally comprise a single transmitter transducer; similarly, a two-dimensional system may minimally comprise two unique orthogonal signal emitting transmitter transducers. A minimal 3-dimensional system comprises three transducers, 61–63 emitting statistically nearly orthogonal signals; additional transducers, operable as described below are represented by a single transducer 64, but are not limited to only one single additional transducer. Each transmitter transducer 61–64 typically comprises an ultrasonic transducer, e.g. a ceramic transducer operable in the 40 KHz range, but may include other transducers and/or other frequency e.g. into the audible range or high ultrasonic range, as appropriate for the acoustic signals to be emitted and resolution to be provided.

The transmitter transducers 61–64 are energized, via drivers 81–83, by wide-band composite code signals (at XOR gate outputs 76A–79A) provided by combined pseudo-random binary codes provided by generators 71–74 combined with a translation signal, such as from an oscillator 80 which also clocks the generators 71–74. The codes from the generators 71–74 and the translation signal are combined or added (modulo-2) by exclusive-or (XOR) gates 76–79 to make the wide-band composite codes at 76A–79A. Alternately, the wide-band composite codes at 76A–79A, once determined, may also be stored and replayed in and from suitable memory elements as part of or in place of the code generators 71–74 and XOR gates 76–79. To begin all transmitter transducer emissions from among the transducers 61–64 at a known point in their sequence, an initialization circuit 75 initializes all the code generators 71–74 with their respective different present values upon system start-up. According to one embodiment of the present invention, all transducers emit their signals, which are distinguished and individually identified by the receivers described below.

Figure 2A:
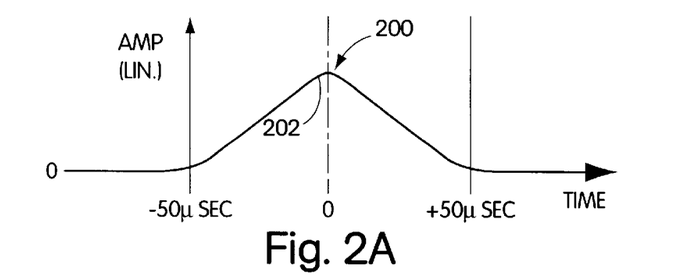
FIGS. 2A, 2B, 2D and 2F are graphical time-domain auto-correlation of various codes illustrating a conventional maximal linear (m-sequence) code, a wide-band composite code with unrestricted bandwidth, a wide-band composite code with bandwidth restrictions of one and one-half octaves, and a restricted wide-band composite code with frequency compensation, respectively.
Figure 2B:
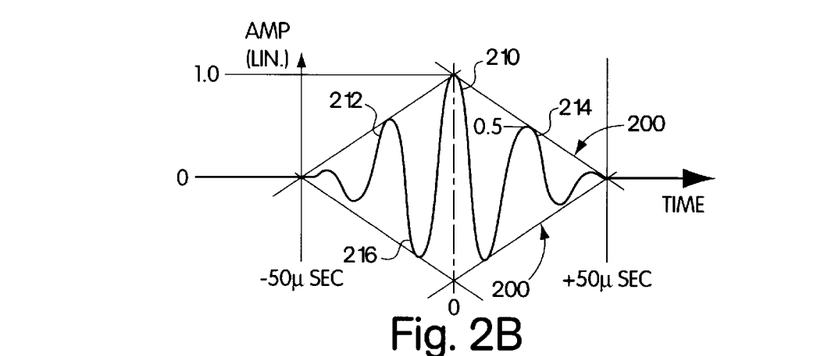
Figure 2D:
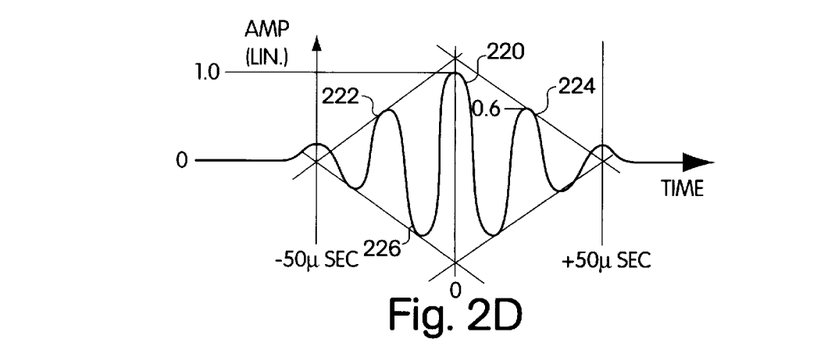
Figure 3A:
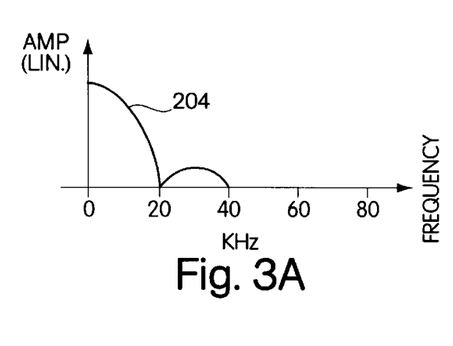
FIGS. 3A, 3B, 3D and 3F are graphical frequency-domain representations of the code signals corresponding to the signals shown in FIGS. 2A, 2B, 2D and 2F, respectively.
Figure 3B:
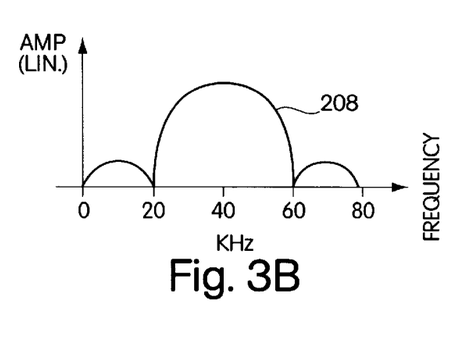

A wide-band acoustic signal from each of the transducers 61–64 is provided when the data pseudo-random output bit rate or "chip rate" from the code generators 71–74, determined principally by the clock rate received from the clock source or oscillator divider 85, is relatively fast for a given translation frequency as provided by the period of the oscillator 80 output signal. Thus, according to one embodiment of the present invention, a relatively low oscillator frequency division value of N=2 is chosen to provide a wide-band acoustic signal emitted from transducers 61–64 having two carrier cycles per chip, as shown by time-domain graph 206 of FIG. 2B, also having a spectral (frequency domain) response 206 of FIG. 3B. The correlation signal peak 202 of a conventional pseudo-random code of 50 $\mu$sec per chip is shown in FIG. 2A and its corresponding spectrum of graph 204 in FIG. 3A. A triangular shape envelope of 200 provides a time and amplitude reference for the temporal correlation waveforms 202, 210, 220, 230.

The wider bandwidth composite coded signals (e.g. at 76A–79A) provide enhanced speed of identification by correlation, discussed below. Larger or small division values (preferably N=1 to N=4) are also acceptable according to the present invention, and produce a correspondingly different acoustic output signal and correspondingly wider or narrower spectrum graph.

Figure 2F:
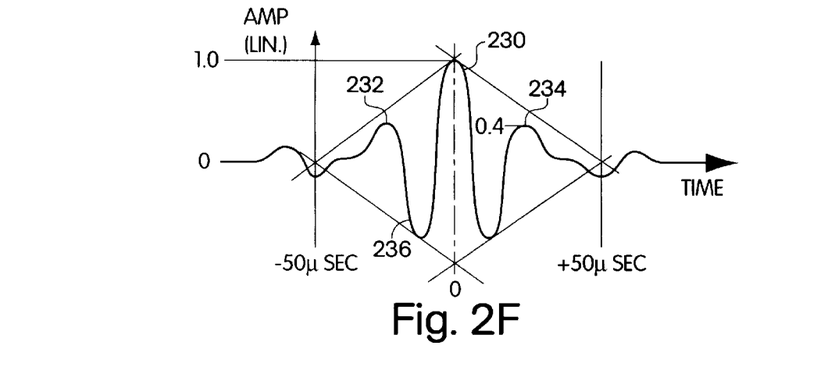
Figure 3C:
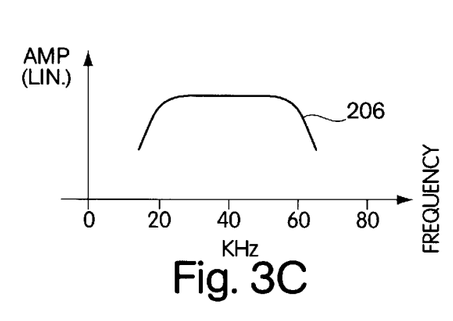
FIGS. 3C and 3E are frequency domain representations of the typical practical system frequency bandwidth and an exemplary embodiment of the bandwidth shaping according to the present invention.
Figure 3D:
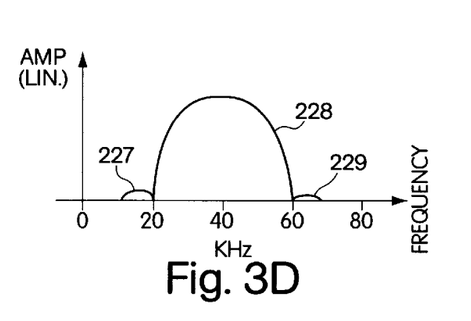
Figure 3E:
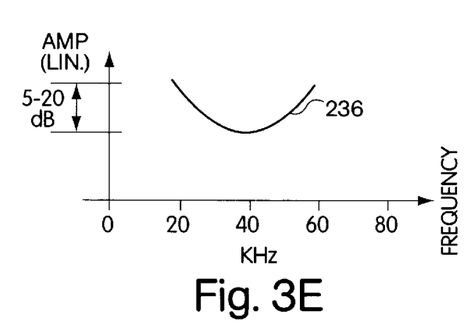
Figure 3F:
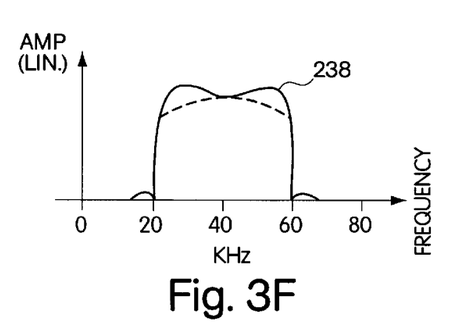

The typical uncompensated bandwidth 206 of FIG. 3C of practical implementations of the transmitters and receivers according to the present invention results in a reduced bandwidth code signal 228 of FIG. 3D, which narrows the main lobe 228 and nearly eliminates the sidelobes 227, 229. Such bandwidth reduction results in the relative increase in the temporal correlation peaks 222, 224 adjacent to the main correlation peak, 220. Applying bandwidth shaping (or pre-shaping) to the signal along the signal path between the composite code generators 76–79 and the correlator output substantially flattens the overall code spectrum 238 which results in a reduction in temporal correlation peaks 232, 234 with respect to the main correlation peaks 230. In some embodiments, the transducer drivers 81–84 and/or pre-amplifiers 126–128 include frequency compensation circuitry therein; alternately, the transmitted code, the code replica, and/or the Fast-Fourier Transform implementation of the correlators 161–178. The particular amount and type of compensation 236 applied is provided to restore the bandwidth 238 and optimize the distinction between the main correlation peak 230 and adjacent peaks 232 and 234, as illustrated in FIGS. 2F, 3E and 3F. In the embodiment illustrated, the amplitude difference of the main peak 220 relative to the adjacent peaks 222 and 224 of 0.4 (1.0–0.6) is improved to 0.6 (1.0–0.4) for compensated signal peaks 230 with respect to peaks 232 and 234.

Figure 4A:
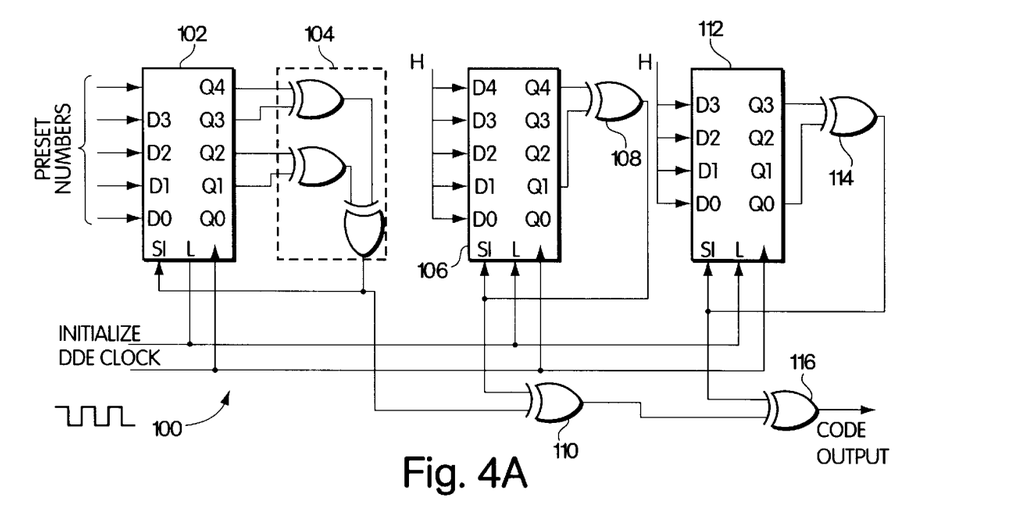
FIG. 4A is a schematic diagram of the code generator of one embodiment of the present invention having unique, short, pseudo-random binary codes for each transmitter source which codes are statistically nearly orthogonal and have bounded cross-correlation peaks.

A particular embodiment 100 of the pseudo-random binary code generator according to the present invention is shown in FIG. 4A, wherein a first code generator signal is provided by serial shift register 102, pre-settable from a parallel input with a preset number (from initialize circuit 75) different for each transmitter. The last 4 (of 5) Q output signals are combined by exclusive-or gates 104 and the result is received by the shift register 102 serial input. The shift register propagates the serial input signal(s) according to the code clock signal provided by divider 85. Similarly, a second code is generated by shift register 106 which parallel input is reset to all "high" levels when initialized and the second and fifth (of 5) Q output signals are exclusive-ored by gate 108 and recirculated via the serial input on register 106, and also exclusive-ored with the first code (from XOR 104) by XOR gate 110. A third level code is similarly provided by a shift register 112 which is initially reset to high upon initialization, and whose first and fourth (of 4) Q output signals are exclusive-ored by gate 114, the result of which is received by the shift register 112 serial input and is combined by a further XOR gate 116 with the pseudo-random code output from the XOR gate 110 to produce a signal, which is a composite code generated from maximal and Gold sequences. This signal, when combined with the translation signal, creates a wide-band composite code signal to be emitted by the corresponding transducer, which is a wide-band composite code signal.

The code sequences of the various transmitters of the above, exemplary embodiment are statistically nearly orthogonal and uniquely distinguishable. However, alternate embodiments may provide for a selected number (some or all) of transmitters to transmit the same code, having sufficient and unique time offsets (or "taps") along the length of or within the code sequence, for each transmitter to provide a uniquely identifiable and correlatable code segment to the each receiver operable within the active area of the present invention. Exemplary code sequence(s) comprises codes individually determined as described above, and also comprises a longer chip length code having sufficient individual code portions therealong to allow the receiver(s) to correlate, and thus uniquely identify each transmitter.

Figure 4B:
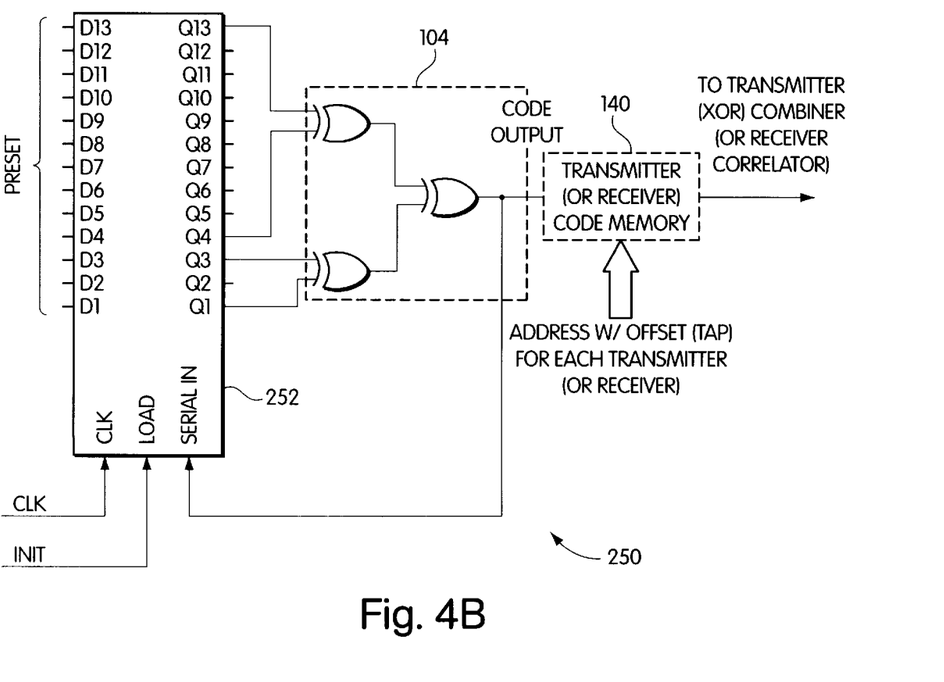
FIG. 4B is a schematic diagram of a code generator of an alternate exemplary embodiment according to the present invention providing one of a long m-sequence code with one tap for each transmitter source.

An exemplary long m-sequence code generator 250 according to the present invention and shown in FIG. 4B, provides a maximal length code of degree 13, which is also a Gold preferred pair base sequence, having a repeat length of $2^{13}-1$, or 8,191 chips. At 50 $\mu$sec per chip (clock interval), the resulting code repeats every 410 milliseconds. The serial-in, parallel-output 13-stage register 252 receives a clock signal from divider 85 and a preset data signal from circuit 75, and provides the Q1, Q3, Q4 and Q13 outputs to exclusive-or gates 104, the output of which is recycled to the serial input of the register 252, and provides the m-sequence code output according to the clock input and the offset or "tap" determined by a corresponding preset data. Each transmitter code is separated by approximately 1024 chips from the other transmitters along the code sequence. Each transmitter's recent portion of the m-sequence code sequence is statistically sufficiently orthogonal to the other transmitter's recent portion to provide rapid and accurate correlation according to the present invention. In the embodiment having stored samples or replicas of the pseudo-random binary code, the m-sequence code from the gates 104 is stored in a corresponding memory 140, and the offset or tap is provided by a corresponding additional memory increment being added to the address received by the memory. Thus, eight different codes (for any given time interval) are provided by code outputs spaced uniformly along this repeat length, or 50 milliseconds apart, which corresponds to 17 meters of acoustic propagation. The 50 milliseconds of output spacing provides ample time for ambiguity resolution and echo dispersion in many environments.

Figure 1B:
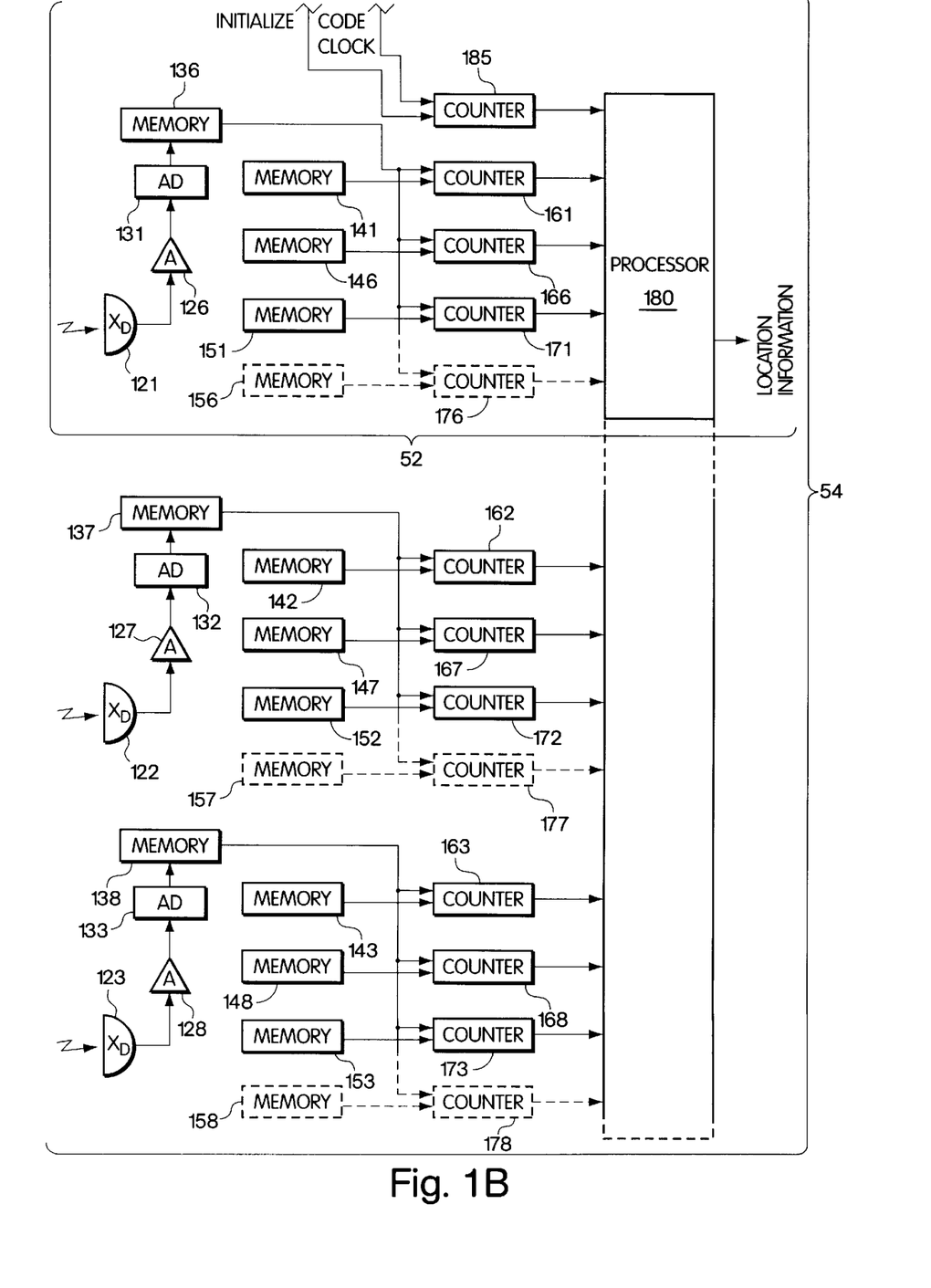

According to one embodiment of the present invention, the transmitted wide-band acoustic signals are received and processed by the single-point receiver system 52, and in a further embodiment which provides determination of yaw, pitch and roll, or independent multi-point body tracking, in multi-point receiver system 54 which includes the system 52. The yaw, pitch and/or roll is determined according to the relative location of the multiple receiver points determined according to the present invention by processor 180 according to geometric construction techniques known in the art. Also, multiple independent (e.g. body tracking) points are independently determinable with processor 180.

The single point system 52 has an receiving transducer 121, comprising a ceramic or equivalent ultrasonic transducer for receiving the transmitted signal frequency at the point to be located. Other transducers appropriate for the signal frequency are also usable according to the present invention. The multiple point receiver system 54 comprises additional receiving transducers 122 and 123 (shown parenthetically) which, and the subsequently associated hardware and software up to the calculation of yaw, pitch, roll and/or other receiver point locations, are substantially identical to receiving transducer 121 and its associated hardware. The transducer 121 (122, 123) output signal is amplified by amplifier 126 (127, 128) and converted to digital format by A/D converter 131 (132, 133) and stored in its respective memory 136 (137, 138). As each transmitter has its own code (or a separately correlated portion of a long code) a separate replica of each code is stored in a respective memory 141 (142, 143), 146 (147, 148), 151 (152, 153), or regenerated to provide the equivalent code signals. The code replicas, together with a digitized received signal from the memory 136 (137, 138) are received by respective correlators 161 (162, 163), 166 (167, 168) and 171 (172, 173) (or other equivalent device) which identify that the transmitter's acoustic signal is being received (from among the several transmissions which may be simultaneously received) and the point of correlation between the received signal and that transmitter's code replica. When more than three transmitters are used, additional correlation is provided against additional replica(s), exemplified by memory 156 (157, 158) and correlator 176 (177, 178).

The ongoing time is accumulated by counter 116 which provides a "time stamp" for the starting point of the block of received samples relative to the transmit position in the wide-band composite codes. The resulting signal from the counter 116, together with the output correlation signals from the correlators are received by a processor 180 which relates the correlation peak relative to the counter signal to determine the time-of-flight for the received signals from each of the transmitters. As many transmitters may be received and identified with varying degree of correlation, the present invention additionally identifies the best of the signals to provide the best certainty of the position of the receive transducer(s) 121 (122, 123) by discarding or appropriately weighing of the poorer correlations, by geometric sensitivity to the location of the transmitters, by least-squares-fit of redundant measurements, or other methods generally known.

One and 2-dimension position determination embodiments according to the present invention is provided minimally with one and 2 transmission code sources. Additional transmitter code sources may be added for improved accuracy and/or range, and the distance(s) calculated by weighing, least-squares-fit, and/or other appropriate methods.

The location of the receiver 121 (122, 123) in three dimensions is computed from the time-of-flight of at least three transmitter's signals which are sufficiently correlated as compared to a selected threshold value. Typically, the code correlation signal from each correlator provides a magnitude or other quality of correlation indicator. Only a short portion, or "strip", of the continuously transmitted and received data is correlated for a location update. An identification of the particular code portion or "strip" is stored or provided to the processor 180. A further feature according to the present invention provides the steps of pre-estimating the range of location of the receiver based on the prior determined location or "history" (and thus the identified code sequences) and the maximum expected movement in the interval since the last location determination. After the step of pre-estimating, the correlation of the received signals and the code replicas likely to appear within the pre-estimated range of locations is calculated.

Except for the additional features of the present invention herein indicated, the calculation provided by the processor generally comprises trigonometric calculation known in the art, and is thus incorporated.

According to the preferred embodiment of the present invention, a substantial portion of the transmitter 50 and receiver 52 or receiver 54 is implemented in a digital signal processor, typically including one or more digital processors programmable to provide the memory, correlation, counter, calculating and processing structures and steps as taught herein. An exemplary processor is TMS320C6201 as manufactured by Texas Instruments. In the present exemplary embodiment, a "strip" of five milliseconds of transmitted and received data is used to generate a correlation value. Concurrently during the correlation process, a new strip of code is transmitted and received to provide the next correlations for a continuous series of updates.

The following pseudo-code is an exemplary implementation of the process according to the present invention, such as with a multiply tapped code of 8,191 chips in length, or transmitter-unique shorter codes each of about 500 chips or less in length. An application such as a head-tracker for a helmet-mounted display is shown.

Initialize
    Generate and store the "wide-band composite" code
I/O processor do forever:
    DMA simultaneously a strip of code to each transmitter
    DMA simultaneously each receiver A/D data into memory buffers
    Increment time stamp counter after each chip
End of I/O processor do forever
Main processor wait until newest code strips have finished being transmitted
    For all receivers:
        Bandwidth shape the receiver data
        Identify nearby transmitters based on expected receiver location from history
        Find all nearby transmitters:
            Make the reference strip for correlation based on:
                1. The location along the code of the transmitter's newest strip based on time stamp counter value 2. An adjustment to the location along the code for the expected time-of-flight from transmitter to receiver, based on the expected receiver location from history Doppler correct the receiver data based on location history derivatives Correlate the received data to the transmitter's reference strip End for all nearby transmitters Compute the receiver's location in three-dimensional space Find three or more correlations with magnitudes over the threshold value Compute the distances to their transmitters from the correlations Trigonometrically compute the receiver location using least-squares fit of the distances Save the receiver's location history End for all receivers Compute helmet output data:

Compute the helmet's location and orientation in Six-Degrees-of-Freedom (6DOF)

Send 6DOF to software output module

End main processor wait until loop

Moreover, since the trigonometric acoustic position calculations referred to above rely on a selected numeric value for the speed of sound in an acoustic medium, e.g. air in the present application, the accuracy of the acoustic position measurement can be further enhanced according to the present invention by receiveing the time-of-flight for each of a plurality of transmitter-to-receiver transmissions each disposed relative to known locations and a common unknown location, calculating the position of the unknown location according to the initially selected numeric value representing the speed of sound in the acoustic medium, determining the position error (between actual and calculated position) and adjusting the selected numeric value of the speed of sound to minimize the position error.

Other processor and processing embodiments according to one of ordinary skill in the art are within the scope of the present invention. Further alternative embodiments of the present invention provide wireless connections between the transducer(s) and the respective amplifiers, transmitters and/or receivers. The transmitters' and/or receivers' connections advantageously include wireless infrared or RF, analog and/or digital links which correspondingly send or receive signals before and after digitization.

These and other modifications and substitutions made by one of ordinary skill in the art are within the scope of the present invention, which is not to be limited except by the claims which follow.

What is claimed is:

1. Apparatus for position determination, comprising:
a plurality of transmitters, each having a known relative position, and each providing a transmitted repeating sequence of acoustic signals unique to each of said plurality of transmitters and further providing a corresponding synchronization signal;
a receiver for receiving said repeating sequence of acoustic signals from said plurality of transmitters and providing a signal corresponding to the received said repeating sequence of acoustic signals, and including
a code generator providing a replica of each of said repeating sequence of acoustic signals of said plurality of transmitters, and said synchronization signal,
a code detector receiving each of said replicas, a signal corresponding to the received said sequence of acoustic signals and said synchronization signal, and providing a signal identifying said transmitted signal and the time-of-flight thereof; and
a location calculator receiving the signal identifying the received transmitted signals and the corresponding times-of-flight, and providing signals indicating the position of the receiver relative to the identified said transmitters.

2. The apparatus of claim 1, further comprising means for shaping the system bandwidth.

3. The apparatus of claim 1, comprising at least three transmitters having a known relative position, each simultaneously providing a transmitted sequence of said acoustic signals in a selected relationship to said synchronization signal, wherein
said code generator provides replicas of each statistically nearly orthogonal acoustic signal,
said code detector identifies said received transmitters and the times-of-flight therefrom,
said location calculator receiving the signal identifying said received transmitters and the corresponding times-of-flight, and providing the position of the receiver relative to the identified said transmitter, and providing corresponding three-dimensional position signal.

4. The apparatus of claim 3 further comprising
a plurality of receivers having known locations relative to each other and each being movable relative to each transmitter, and
an orientation calculator receiving the identification signal and time-of-flight for each of the transmitters from each of the receivers, providing an orientation signal corresponding to an orientation selected from yaw, pitch and roll.

5. The apparatus of claim 3, wherein said at least three transmitters comprises more than three transmitters, said code detector further provides a correlation signal for each of said received sequence of acoustic signals, said location calculator further including
a signal selector for selecting the best signals corresponding
a signal selector for selecting the best signals corresponding to the highest correlation signals above a selected signal threshold.

6. The apparatus of claim 3, wherein said plurality of transmitters comprises randomly disposed transmitters.

7. The apparatus of claim 3, wherein each said transmitter includes
a signal generator for providing a distinguishable sequence of a pseudo-random code signal from each said transmitter.

8. The apparatus of claim 7, wherein each said pseudo-random numeric code comprises a m-sequence code.

9. The apparatus of claim 7, wherein each said pseudo-random code comprises a composite of a plurality of m-sequence codes.

10. The apparatus of claim 7, wherein said transmitted sequences comprise selectable time-offset portions of one long pseudo-random code.

11. The apparatus of claim 3, wherein at least one of said plurality of transmitters includes
a wide-band composite code generator providing a pseudo-random code having frequency components substantially at or below an upper frequency,
a translation frequency generator providing a translation signal having a frequency greater than said upper frequency of said acoustic signal, a signal combiner of said pseudo-random code and translation signal, and providing a wide-band composite code signal therefrom.

12. The apparatus of claim 1, wherein each code detector comprises a signal correlator.

13. The apparatus of claim 12, further including a code replica selector which provides a selected range of the code replica to said signal correlator according to the prior determined receiver position and a maximum expected range of movement from said prior determined receiver position.

14. The apparatus of claim 11, wherein said signal combiner comprises an exclusive-or gate.

15. Apparatus for position determination, comprising:

a transmitter, having a known position, and providing a transmitted sequence of acoustic signals, and further providing a corresponding synchronization signal;

a receiver for receiving said sequence of acoustic signals from said transmitter and providing a signal corresponding to the received said sequence of acoustic signals, and including a code replica generator providing a replica of said sequence of acoustic signals of said transmitter, and said synchronization signal, a code detector receiving said replica, a signal corresponding to the received said sequence of acoustic signals and said synchronization signal, and providing a time-of-flight thereof; and a location calculator receiving the times-of-flight, and providing signals indicating the position of the receiver relative to said transmitter.

16. A method for providing position determination, comprising the steps of:

providing a transmitted repeating sequence of acoustic signals and a corresponding synchronization signal from at least one transmitters having a known position; and receiving said transmitted repeating sequence of acoustic signals with a receiver, including the steps of providing a portion of a replica of said repeating acoustic signals with a known relationship to said transmitter and to said synchronization signal with a code memory, receiving said replica, a signal corresponding to each of said repeating sequences, and said synchronization signal, with a code detector providing a signal identifying the received said transmitter and the time-of-flight therefrom, and calculating the receiver location according to the signal identifying the received transmitter and the corresponding times-of-flight, and providing a signal indicating the position of the receiver relative to the identified said transmitter, and providing corresponding position signals.

17. The method of claim 16, wherein said step of providing a transmitted sequence of acoustic signals comprises the step of providing a wide-band composite code acoustic signal, said step of receiving includes the step of directly correlating said received acoustic signals and said replica, providing a correlator output signal.

18. The method of claim 16, wherein the step of providing a transmitted sequence of acoustic signals comprises the step of providing an acoustic signal comprising a pseudo-random number code.

19. The method of claim 16, wherein the step of providing a transmitted sequence of acoustic signals comprises the step of simultaneously providing a transmitted sequence of acoustic signals from a plurality of transmitter transducers, wherein said step of receiving includes the step of identifying at least as many transmitters as position dimensions to be determined.

20. A method for acoustic position measurement, comprising the steps of:

selecting a numeric value for the speed of sound in an acoustic medium;

receiving the time-of-flight for each of a plurality of transmitter-to-receiver-transmissions each disposed relative to known locations and a common unknown location;

calculating the position of the unknown location according said selected numeric value representing the speed of sound in the acoustic medium;

determining a position error; and adjusting the selected numeric value of the speed of sound to minimize the position error.

* * * * *